(12) United States Patent
Rosemann

(10) Patent No.: US 8,002,509 B2
(45) Date of Patent: Aug. 23, 2011

(54) FASTENING SYSTEM FOR FASTENING COMPONENTS, IN PARTICULAR FOR MOTOR VEHICLES

(75) Inventor: Frank Rosemann, Münzenberg (DE)

(73) Assignee: Newfrey LLC, Newark, DE (US)

( * ) Notice: Subject to any disclaimer, the term of this patent is extended or adjusted under 35 U.S.C. 154(b) by 349 days.

(21) Appl. No.: 12/204,364

(22) Filed: Sep. 4, 2008

(65) Prior Publication Data
US 2009/0060634 A1    Mar. 5, 2009

(30) Foreign Application Priority Data

Sep. 5, 2007   (DE) .......................... 10 2007 042 034

(51) Int. Cl.
*F16B 33/02* (2006.01)
(52) U.S. Cl. .................. 411/549; 411/366.1; 24/457
(58) Field of Classification Search ............. 411/511, 411/512, 427, 549, 551, 527, 366.1; 24/457, 24/105, 1, 662, 663
See application file for complete search history.

(56) References Cited

U.S. PATENT DOCUMENTS

| | | | |
|---|---|---|---|
| 367,196 A * | 7/1887 | Deblieux | 411/186 |
| 1,511,445 A * | 10/1924 | Clarkson | 24/105 |
| 2,077,355 A | 4/1937 | Chaffee | |
| 2,186,746 A * | 1/1940 | Albin | 411/549 |
| 2,681,678 A | 6/1954 | Albert | |
| 3,115,804 A | 12/1963 | Lee | |
| 3,150,556 A * | 9/1964 | Churchill | 411/520 |
| 3,466,966 A * | 9/1969 | Brown | 411/510 |
| 4,269,248 A * | 5/1981 | MacLean et al. | 411/186 |
| 4,369,012 A * | 1/1983 | Bailet et al. | 411/437 |
| 5,111,557 A * | 5/1992 | Baum et al. | 24/662 |
| 5,967,725 A * | 10/1999 | Voges | 411/386 |
| 5,980,180 A * | 11/1999 | Schiess | 411/522 |
| 6,871,431 B2 * | 3/2005 | Schmidt | 40/200 |
| 7,052,224 B2 * | 5/2006 | Venus et al. | 411/512 |
| 7,401,387 B2 | 7/2008 | Rosemann | |

FOREIGN PATENT DOCUMENTS

DE   10 2005 020 011.7      11/2006

OTHER PUBLICATIONS

Article from N.T.I.S. Tech Notes, Springfield, VA, USA dated Dec. 1986, p. 1340 entitled "Quick-Connect Heavy-Duty Fastener".

* cited by examiner

*Primary Examiner* — Flemming Saether
(74) *Attorney, Agent, or Firm* — Michael A. Leary

(57) ABSTRACT

A fastening system including a stud with a shank and an annular flange whose diameter is greater than the diameter of the shank. The system further including a nut with a bore and an internal thread formed in the bore, the internal thread having a helical thread ridge formed in the bore and a thread groove running next to the thread ridge. The annular flange of the stud can be screwed into the internal thread.

24 Claims, 1 Drawing Sheet

ND SYSTEM FOR FASTENING
FASTENING SYSTEM FOR FASTENING COMPONENTS, IN PARTICULAR FOR MOTOR VEHICLES

CROSS-REFERENCE TO RELATED APPLICATIONS

This application claims the benefit of German Application No. 10 2007 042 034.1, filed Sep. 5, 2007, the disclosure of which is incorporated herein by reference.

BACKGROUND OF THE INVENTION

The invention concerns a fastening system for fastening components, in particular in motor vehicles, wherein a stud is provided that has a shank and an annular flange whose diameter is greater than the diameter of the shank.

In a fastening system of the specified type known from DE 10 2005 020 011 A1, a clip with a U-shaped retaining region having a lateral entry opening for introducing the stud is used for fastening components, wherein the retaining region extends around the shank of the stud below the annular flange and bears against the flange in the axial direction. The clip also has a resilient locking finger, the free end of which projects into the entry opening and secures the stud in the entry opening after installation. The prior art fastening system has the disadvantage that the clip must be moved both axially and radially relative to the stud during installation. Consequently, the fastening system is less well suited for automatic installation. Moreover, the retention force of the fastening system is limited by the fact that under tensile loading, the retaining region—which is open on one side—can spread apart, thus allowing the stud flange to come out of the retaining region.

In addition, fastening systems are known in which the stud has an external thread, wherein a nut provided with an internal thread, or a clip provided with latching fingers, is joined to the stud by being screwed on or snapped on. This fastening system has the disadvantage that manufacturing the stud is more resource-intensive and that additional means are required to secure against spontaneous loosening.

SUMMARY OF THE INVENTION

An aspect of the invention is to create a fastening system of the initially mentioned type that is easy to install and is suitable for automatic installation. Moreover, the fastening system may further provide high retention forces and security against spontaneous loosening.

The fastening system according to one aspect of the invention may includes a stud that has a shank and an annular flange whose diameter is greater than the diameter of the shank; and a nut with an internal thread that is formed in a bore, that has a helical thread ridge and a thread groove which runs next to the thread ridge, and that is designed such that the annular flange of the stud can be screwed into the internal thread.

The invention is based on the finding that a nut provided with an internal thread can also be screwed onto a stud with an annular flange extending between two radial planes if the internal thread is dimensioned large enough so that the flange of the stud can be moved through the internal thread by the means that its circumferential edge only partially engages the thread groove and the side opposite the area engaging the thread groove slides along over the thread ridge, wherein the nut performs a wobbling rotary motion while being screwed on.

According to one aspect of the invention, the fastening system has the advantage that the stud can be manufactured easily and economically, since it requires only an annular flange, and no helical or spiral-shaped thread ridge. According to another aspect, the fastening system may have the further advantage that the nut is secure against spontaneous loosening once the annular flange has emerged from the internal thread in the fastening position. Since the flange constitutes a closed ring, it provides the thread ridge on the end of the thread no opportunity to engage and draw the flange into the thread groove. Once screwed on, therefore, the nut can only be released again by destroying its internal thread.

According to another aspect of the invention, comparatively high retention forces may be accommodated, since the closed, annular nut has great resistance to radial expansion and the thread ridge can be designed to be adequately stable.

According to another aspect of the invention, in order to make it possible and easier to screw the nut onto the stud, the internal thread of the nut may have an entry opening that is bordered in part by the thread ridge and in part by the thread groove, and for the entry opening may have a minimum diameter that is at least slightly larger than the maximum outer diameter of the flange of the stud. Moreover, provision can additionally be made that the root of the thread groove has, in the vicinity of the entry opening, a radial distance from the center axis of the internal thread that is greater than the radius of the flange of the stud.

According to another aspect of the invention, so that the flange of the stud is held securely in the nut in the fastening position, provision can further be made that the radial distance between the root of the thread groove and the center axis of the internal thread decreases with increasing distance from the entry opening. When the fastening position is reached, the reduced distance to the root of the thread groove forces the stud into a centered position in which it is adequately supported on the trailing end of the thread groove.

According to another aspect of the invention, the internal thread of the nut is a tapered thread, which narrows with increasing pitch starting from the entry opening. The conical shape of the internal thread facilitates placement and screwing-on of the nut, and achieves adequately secure support in the fastening position.

According to another aspect of the invention, the stud in the fastening system may have only one circumferential ridge in the form of the flange, only one threaded ridge of comparatively short circumferential length is required for the internal thread as well. The internal thread can thus be made relatively short in the axial direction. Accordingly, the stud can also have a shorter length. It has proven advantageous for the thread ridge of the internal thread to have a maximum circumferential length of 540° and a minimum circumferential length of 360°.

According to another aspect, the thread ridge of the internal thread may have, on the side opposite the entry opening, an end section having a flat support surface, perpendicular to the center axis of the internal thread, for the flange of the stud. This ensures good support of the nut on the flange of the stud and avoids excessively high surface pressure between the flange of the stud and the thread ridge.

As already mentioned, the nut may perform a wobbling motion when screwed onto the stud. So that the wobbling motion is not impeded by the contact of the nut with the component to be fastened, particularly in the vicinity of the fastening position, and to achieve the result that the nut rests against the component to be fastened with preloading in the fastening position, provision is made according to a further proposal of the invention that the nut has a support surface on the side of the entry opening that is arranged on an elastically resilient part of the nut. The elastically resilient part of the nut is preferably a conical collar that extends to the outside and toward the entry side of the nut. In order to increase the elastic resilience, the conical collar can be provided with radial slots.

The flange of the stud preferably has a cylindrical shape with flat end faces, but can also be designed differently, for example having the shape of a truncated cone. The flange is preferably located at the head end of the stud; however, it can also be a distance from the head end of the stud. Depending on the shape of the stud flange, the internal thread of the nut may be designed as a square or rectangular thread, or as a trapezoidal or sawtooth thread.

BRIEF DESCRIPTION OF THE DRAWINGS

The invention is explained in detail below on the basis of an example embodiment which is shown in the drawing. Shown are.

DETAILED DESCRIPTION OF THE EXEMPLARY EMBODIMENTS OF THE INVENTION

Figure 1:
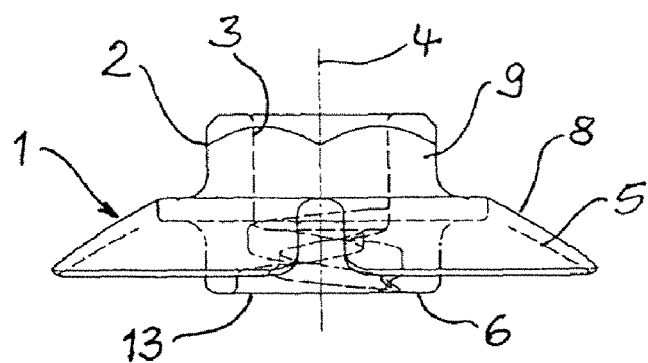
FIG. 1 a side view of a nut for the fastening system according to an exemplary embodiment of the invention, FIG. 2 a view of the top of the nut from FIG. 1, and FIG. 3 a cross-section through the fastening system according to an exemplary embodiment of the invention.
Figure 2:
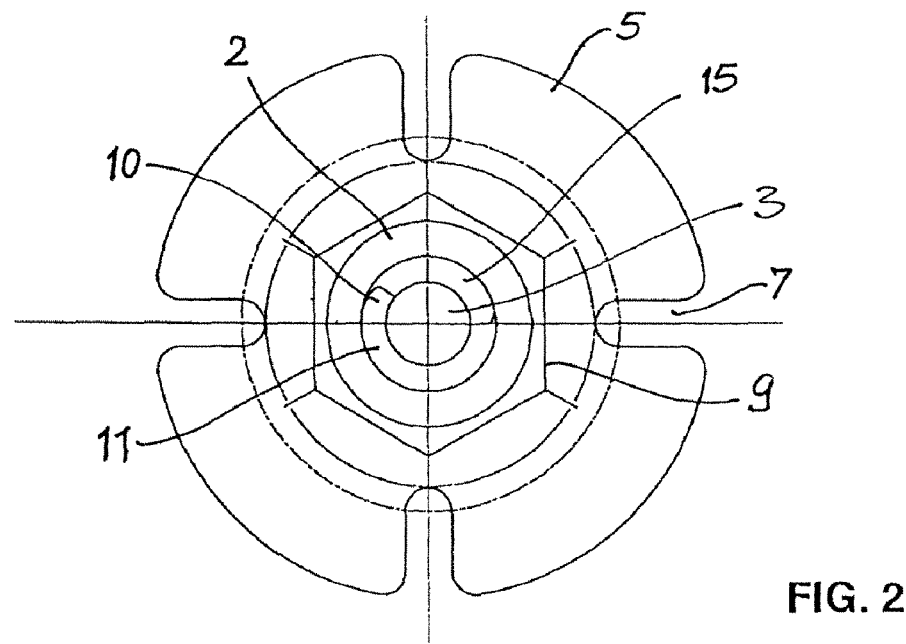

The nut 1 shown in FIG. 1 includes a sleeve 2 with a through bore 3 that extends along a central axis 4. On the outside, the sleeve 2 has a resilient, conical collar 5, which extends radially to the outside and toward the underside 6 of the nut 1. The collar 5 is interrupted by four radial slots 7. This increases its elastic resilience. On the top 8 of the nut 1, the outside of the sleeve 2 is provided with a tool engagement region 9 in the form of a hexagonal prism.

Formed in the lower section of the bore 3 is an internal thread 10 in the manner of a square thread. The internal thread 10 has a helical thread ridge 11 and a thread groove 12 running adjacent to the ridge. The thread ridge 11 extends from the underside 6 to a middle region of the bore 3 and terminates at an acute angle at its bottom and top ends. The thread groove 12 runs above the thread ridge 11 and continues beyond the lower end of the thread ridge 11 in order to form a large entry opening 13 there. The thread ridge 11 and the thread groove 12 have a rectangular cross-sectional profile. Only the bottom starting region of the thread ridge 11 is provided on the inner edge with an entry bevel 14 extending downward and outward. The entry bevel 14 also contributes to enlarging the entry opening 13 of the internal thread 10. At its top surface, the trailing edge of the thread ridge 11 forms a flat support surface 15 that is perpendicular to the axis 4. The root of the thread groove 12 has a radial spacing from the axis 4 at the entry opening 13 that is considerably larger than the radius of the stud flange that is to be screwed into the internal thread 10. The radial spacing of the groove root from the axis 4 decreases continuously with increasing distance from the entry opening, and achieves a spacing above the upper end of the thread ridge 11 that only slightly exceeds the radius of the stud flange that is to be screwed in. The curvature of the thread groove 12 thus increases steadily from bottom to top.

Figure 3:
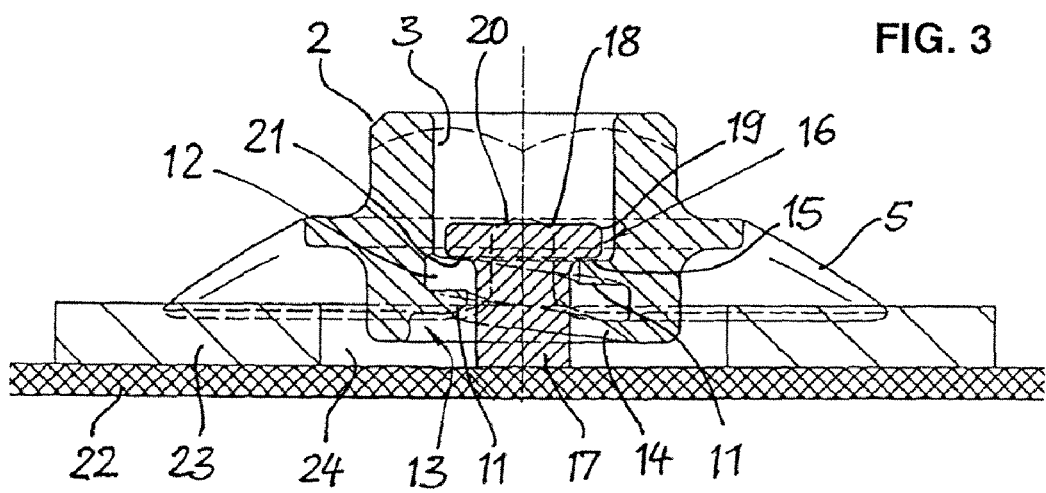

FIG. 3 shows the fastening system in the fastening position, in which the nut 1 is screwed onto a stud 16. The stud 16 has a cylindrical shank 17 and a head 18 having an annular, cylindrical flange 19 whose outer diameter is greater than the outer diameter of the shank 17. The upper end face of the flange 19 and the end surface of the head 18 form a flat, circular surface 20 perpendicular to the stud axis. The lower end face of the flange 19 forms an annular surface 21 that is perpendicular to the circular surface 20.

Studs of the described type are known as T-studs and are used for fastening purposes, especially in motor vehicles. However, the fastening system according to the invention is not restricted to T-studs, but is also suitable for stud designs in which the flange is located at a distance from the head end of the stud.

The stud 16 is fastened to a substrate 22, for example a metal sheet, by welding. A component 23 with a fastening opening 24 is arranged on the substrate 22 such that the stud 16 passes through the fastening opening 24. The component 23 is held by the nut 1, which is screwed onto the stud 16 and whose flat support surface 15 of the thread ridge 11 bears against the annular surface 21 of the flange 19. In this position, the collar 5 of the nut 1 rests against the component 23, wherein the collar 5 is elastically deformed toward the top 8 and thereby creates a preloading force pressing the component 23 onto the substrate 22.

The nut 1 preferably is screwed onto the stud 15 with the aid of a powered driving tool, wherein the entry opening 13 of the nut is placed at an angle on the flange 19 of the stud 16 and is then driven rotationally. During the rotation, the tool executes a slight wobbling motion so that the flange can follow the climbing spiral path of the thread groove 12 and thread ridge 11. The fastening process is completed as soon as the flange 19 has reached the fastening position in the bore 3 of the nut 1 shown in the drawing. In this position, the thread ridge 11 is located beneath the flange 19 in contact with the annular surface 21, so that it is no longer possible to unscrew the nut. The fastening is thus secure against spontaneous loosening.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A fastening system comprising:
   a stud comprising a T-stud fastened to a part by welding, and including a shank and an annular flange whose diameter is greater than the diameter of the shank; and
   a nut comprising a bore and an internal thread formed in the bore, the internal thread comprising a helical thread ridge formed in the bore and a thread groove running next to the thread ridge;
   wherein the nut is configured such that the annular flange of the stud can be screwed into the internal thread.

2. The fastening system according to claim 1, wherein the internal thread of the nut has an entry opening that is bordered in part by the thread ridge and in part by the thread groove, and in that the entry opening has a minimum diameter that is at least slightly larger than the maximum outer diameter of the flange of the stud.

3. The fastening system according to claim 2, wherein a root of the thread groove in the vicinity of the entry opening has a radial distance from a center axis of the internal thread that is greater than the radius of the flange of the stud.

4. The fastening system according to claim 3, wherein the radial distance between the root of the thread groove and the center axis of the internal thread decreases with increasing distance from the entry opening.

5. The fastening system according to claim 1, wherein the internal thread is a tapered thread.

6. The fastening system according to claim 1, wherein when the nut is in a fastened position, the flange is located outside the thread ridge.

7. The fastening system according to claim 1, wherein the thread ridge of the internal thread has a maximum circumferential length of 540 degree.

8. The fastening system according to claim 1, wherein the thread ridge of the internal thread has, on a side opposite the entry opening, an end section having a flat support surface, perpendicular to the center axis of the internal thread, the flat support surface supporting the flange of the stud when the nut is fastened on the stud.

9. The fastening system according to claim 1, wherein the nut has a support surface on the side of the entry opening that is arranged on an elastically resilient part of the nut.

10. The fastening system according to claim 9, wherein the elastically resilient part of the nut is a conical collar.

11. The fastening system according to claim 10, wherein the conical collar has radial slots.

12. The fastening system according to claim 1, wherein the flange of the stud has a cylindrical shape with flat end faces.

13. The fastening system according to claim 1, wherein the internal thread of the nut is a square or rectangular thread.

14. A nut for clamping a component to a substrate by engagement with a T-stud, including a shank defining a first diameter and an annular head flange defining a second diameter greater than the first diameter, when the T-stud is fastened to the substrate at a first end opposite to the head flange, and the head flange projects through and beyond a fastening opening in the component to be clamped, the nut comprising:
   a sleeve defining a bore;
   an internal thread formed in the bore, the internal thread comprising a helical thread ridge and a thread groove running next to the thread ridge;
   wherein the nut is configured such that the internal thread can be screwed onto the head flange of the T-stud.

15. The nut according to claim 14, wherein the internal thread has an entry opening that is bordered in part by the thread ridge and in part by the thread groove, and in that the entry opening has a minimum diameter that is at least slightly larger than a maximum outer diameter of the head flange of the T-stud.

16. The nut according to claim 14, wherein a root of the thread groove in the vicinity of the entry opening has a radial distance from a center axis of the internal thread that is greater than the radius of the head flange of the T-stud.

17. The nut according to claim 16, wherein the radial distance between the root of the thread groove and the center axis of the internal thread decreases with increasing distance from the entry opening.

18. The nut according to claim 17, wherein the internal thread is a tapered thread.

19. The nut according to claim 14, wherein the thread ridge of the internal thread has, on a side opposite the entry opening, an end section having a flat support surface, perpendicular to the center axis of the internal thread, the flat support surface supporting the head flange of the T-stud when the nut is fastened on the T-stud.

20. The nut according to one of claim 19, wherein the nut has a support surface on the side of the entry opening that is arranged on an elastically resilient part of the nut.

21. The nut according to claim 20, wherein the elastically resilient part is a conical collar.

22. The nut according to claim 21, wherein the conical collar has radial slots.

23. The nut according to claim 22, wherein the internal thread is a rectangular thread.

24. The nut according to claim 23, wherein the nut is made of plastic.

* * * * *